(12) United States Patent
Ploem et al.

(10) Patent No.: US 12,122,093 B2
(45) Date of Patent: Oct. 22, 2024

(54) SYSTEMS AND PROCESSES FOR REINFORCING COMPONENTS OF ARTICLES OF WEAR

(71) Applicant: NIKE, Inc., Beaverton, OR (US)

(72) Inventors: Steven Edmund Jan Cornelis Ploem, Portland, OR (US); Thi Tran, Ho Chi Minh (VN)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 17/341,091

(22) Filed: Jun. 7, 2021

(65) Prior Publication Data

US 2021/0291439 A1 Sep. 23, 2021

Related U.S. Application Data

(63) Continuation of application No. 15/901,646, filed on Feb. 21, 2018, now Pat. No. 11,027,486.

(30) Foreign Application Priority Data

Feb. 21, 2017 (VN) .............................. 1-2017-00602

(51) Int. Cl.
*B29C 64/153* (2017.01)
*A43B 7/14* (2022.01)
(Continued)

(52) U.S. Cl.
CPC .............. *B29C 64/153* (2017.08); *A43B 7/14* (2013.01); *A43B 9/00* (2013.01); *A43D 8/02* (2013.01); *A43D 8/04* (2013.01); *A43D 95/08* (2013.01); *A43D 95/10* (2013.01); *A43D 117/00* (2013.01); *A43D 119/00* (2013.01); *B29D 35/065* (2013.01); *B29D 35/12* (2013.01); *B33Y 10/00* (2014.12); *B33Y 30/00* (2014.12); *B33Y 80/00* (2014.12); *A41H 42/00* (2013.01); *A43D 2200/10* (2013.01); *A43D 2200/40* (2013.01); *A43D 2200/60* (2013.01); *B29K 2101/12* (2013.01); *B29L 2031/505* (2013.01)

(58) Field of Classification Search
None
See application file for complete search history.

(56) References Cited

U.S. PATENT DOCUMENTS 2,392,810 A 1/1946 Cypser
3,851,411 A * 12/1974 Crosbie .................. C08L 23/10
36/68

(Continued)

FOREIGN PATENT DOCUMENTS

CN 103156334 A 6/2013
CN 103298594 A 9/2013
(Continued)

*Primary Examiner* — Michael P. Rodriguez
(74) *Attorney, Agent, or Firm* — Shook, Hardy & Bacon L.L.P.

(57) ABSTRACT

Systems and processes for reinforcing components of articles of wear are disclosed. The processes can include applying a thermoplastic powder to a component of an article of wear and levelling at least a portion of the thermoplastic powder. The processes can also include applying thermal energy to the component and the thermoplastic powder. Further, the processes can include compressing the thermoplastic powder and the component.

20 Claims, 4 Drawing Sheets

(51) Int. Cl.
*A43B 9/00* (2006.01)
*A43D 8/02* (2006.01)
*A43D 8/04* (2006.01)
*A43D 95/08* (2006.01)
*A43D 95/10* (2006.01)
*A43D 117/00* (2006.01)
*A43D 119/00* (2006.01)
*B29D 35/06* (2010.01)
*B29D 35/12* (2010.01)
*B33Y 10/00* (2015.01)
*B33Y 30/00* (2015.01)
*B33Y 80/00* (2015.01)
*A41H 42/00* (2006.01)
*B29K 101/12* (2006.01)
*B29L 31/50* (2006.01)

(56) References Cited

U.S. PATENT DOCUMENTS

| | | |
|---|---|---|
| 4,793,882 A | 12/1988 | Brehmer et al. |
| 9,320,312 B2 | 4/2016 | Lyttle et al. |
| 2007/0132158 A1* | 6/2007 | Martinoni ............ B29C 64/153 264/497 |
| 2008/0040952 A1 | 2/2008 | Celia |
| 2015/0107032 A1* | 4/2015 | Regan ................ B24C 1/086 451/39 |
| 2015/0290877 A1* | 10/2015 | Darland ............. B29C 64/153 427/469 |
| 2015/0367415 A1* | 12/2015 | Buller ................. B29C 64/40 419/53 |
| 2017/0050374 A1* | 2/2017 | Minardi .............. B33Y 10/00 |
| 2018/0235320 A1 | 8/2018 | Ploem et al. |

FOREIGN PATENT DOCUMENTS

| | | |
|---|---|---|
| CN | 203523958 U | 4/2014 |
| FR | 2392810 A1 | 12/1978 |
| GB | 1322324 A | 7/1973 |
| TW | 201334725 A | 9/2013 |
| TW | 201542118 A | 11/2015 |
| TW | I529048 B | 4/2016 |
| WO | 2015/156946 A1 | 10/2015 |

\* cited by examiner

SYSTEMS AND PROCESSES FOR REINFORCING COMPONENTS OF ARTICLES OF WEAR

CROSS-REFERENCE INFORMATION

This application is a continuation application of U.S. application Ser. No. 15/901,646, titled, "Systems and Processes for Reinforcing Components of Articles of Wear," and filed Feb. 21, 2018, which claims priority of Vietnam Application Number VN 1-2017-00602, filed Feb. 21, 2017, and entitled "Systems and Processes for Reinforcing Components of Articles of Wear". The entirety of the aforementioned application is incorporated by reference herein.

TECHNICAL FIELD

The present disclosure relates to components of articles of wear. More particularly, the present disclosure relates to methods and systems for reinforcing components of articles of wear.

BACKGROUND

Traditional methods of manufacturing certain articles of wear, e.g., articles of footwear, include the cutting and combining of individual components. However, the cutting and combining of multiple components can be labor-intensive, and can be error-prone processes resulting in manufacturing defects. Further, such errors can lead to increased waste and reduced manufacturing efficiencies.

BRIEF DESCRIPTION OF THE DRAWINGS

Illustrative aspects of the present invention are described in detail below with reference to the attached drawing figures, which are incorporated by reference herein and wherein.

DESCRIPTION

In general, aspects herein are directed systems and methods for reinforcing a component for an article of wear, such as an article of footwear. Traditionally, when manufacturing an article of wear, e.g., an article of footwear, multiple layers and/or components may be cut and combined together to provide various functional characteristics to the article of footwear, such as resistance to tear, or a restriction of elasticity. However, the cutting and combining of multiple layers and/or components invites manufacturing error at each step, which can result in product defects. In addition, the cutting of individual layers and/or components can result in significant waste.

The processes and systems disclosed herein can alleviate one or more problems discussed above. In aspects, at a high level, the processes disclosed herein utilized deposition manufacturing techniques to bond a reinforcing component to an article of wear with less error, greater efficiency, and reduced waste compared to traditional manufacturing processes.

In certain aspects, the processes described herein can apply a reinforcing component material, e.g., a thermoplastic powder, to an upper for an article of footwear. In aspects, the thermoplastic powder can be indiscriminately applied, e.g., applied over substantially an entire surface of the upper. Further, in such aspects, the reinforcing component material can be selectively bonded to the upper by applying thermal energy, e.g., originating from a laser energy source, to a desired area of the upper and/or a desired area of the thermoplastic powder on the upper. In such aspects, this process can result in increased efficiency, since the application of thermal energy alone may define the size and shape of the reinforced area, as opposed to specifically placing the thermoplastic powder into the size and shape of the reinforced area and then securing it thereto.

In aspects, the indiscriminate application of the thermoplastic powder followed by the selective application of thermal energy results in reduced manufacturing error since the number of precision steps is reduced compared to conventional manufacturing processes. For example, in conventional manufacturing processes the reinforcing component may be precisely cut and then precisely placed and attached to the upper in a specific location, whereas the processes described herein can include the imprecise or indiscriminate application of the thermoplastic powder to the upper followed by the selective application of thermal energy to form, shape, and at least partially bond the reinforcing component to the upper.

In aspects, as further discussed below, the orientation, position, size, and/or shape of the upper can be visually or thermally determined prior to applying thermal energy to the upper. This can result in reduced error and handling of the upper since the upper can be presented to the system in an orientation-independent manner. Further, such a feature can provide increased manufacturing efficiency since the system can detect different sizes or shapes of uppers and modify the application of thermal energy accordingly, without having to change manufacturing equipment specific to a type of size and/or shape of an upper.

In aspects, the selective application of thermal energy to the thermoplastic powder and/or the upper can result in the thermoplastic powder being partially sintered together and/or partially bonded to the upper while the remaining portions of the thermoplastic powder not targeted by the thermal energy remain un-bonded (and/or not sintered). The un-bonded thermoplastic powder on the upper can then be recovered and recycled for potential re-use, resulting in reduced waste.

In aspects, once the thermoplastic powder is sintered together and/or partially bonded to the upper and the un-bonded powder is removed, the reinforcement component can be compressed and fused to get the desired density and adhesion level of reinforced component on the upper. In certain aspects, the processes described herein may also result in less use or no use of hot adhesives traditionally used to reinforce portions of an upper, since the thermoplastic powder can be bonded or fixed to the footwear component itself without application of an adhesive.

Accordingly, in one aspect a method of reinforcing a footwear component is provided. The method includes applying a thermoplastic powder to the footwear component and leveling at least a portion of the thermoplastic powder. The method also includes selectively applying thermal energy to the footwear component to at least partially bond the thermoplastic powder with the footwear component. Further the method includes compressing the thermoplastic powder and the footwear component.

In another aspect, a system of reinforcing a footwear component is provided. The system includes a powder applicator that applies a thermoplastic powder to the footwear component; and a leveler that levels at least a portion of the thermoplastic powder. The leveler can be positioned a defined height above the footwear component. The system also includes a thermal energy source that applies thermal energy to the footwear component to at least partially bond the thermoplastic powder with the footwear component. Further, the system includes a press that compresses the thermoplastic powder and the footwear component.

Figure 1A:
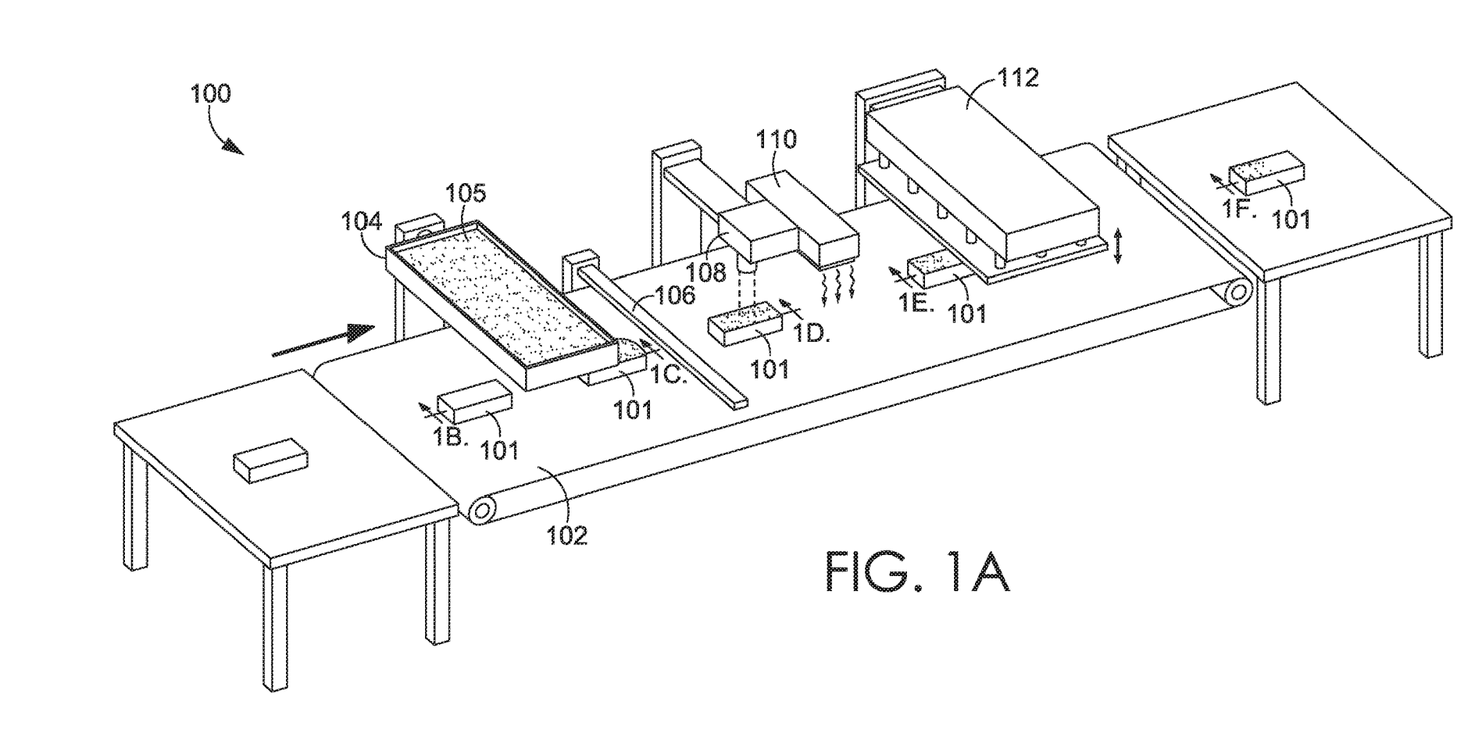
FIG. 1A is a top and side perspective view of an exemplary system for reinforcing a footwear component that includes a powder applicator, a leveler, a thermal energy source, an un-bonded powder removal station, and a press, in accordance with aspects hereof.

Turing now to the Figures, and FIG. 1A in particular, a system 100 for reinforcing a footwear component is depicted. It should be understood that while a footwear component is utilized in the description of the system 100, such a system is also applicable to other articles of wear, such as for the reinforcement of shirts, pants, socks, or sport protective equipment. In one or more aspects, as discussed further below, the reinforcement of the footwear component, or another component of an article of wear, can: function as a rip stop; function as structural reinforcement, limit the stretch of a footwear component material; or function as a dimensional offset for airflow.

As can be seen in FIG. 1A, the system 100 can include a powder applicator 104, a leveler 106, a thermal energy source 108, an un-bonded powder removal station 110, and a press 112. In various aspects, a conveyance system 102 can transfer a footwear component 101 to the various components of the system 100. The conveyance system 102 can include any conventional conveyance system, such as a linear belt conveyance system. It should be understood that the footwear component 101 is schematically depicted and does not represent the size and/or shape of a particular footwear component. In certain aspects, the footwear component 101 is positioned lying substantially flat on the surface of the conveyance system 102.

In certain aspects, the footwear component 101 can be transferred to the powder applicator 104 via the conveyance system 102. In certain aspects, one or more components of the system 100 can include a sensor so that such a component is triggered to act on the footwear component 101 transferred to it, while the conveyance system 102 may continuously run.

Figure 1B:
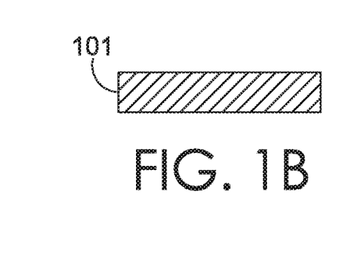
FIG. 1B is a cross-sectional view of a footwear component along the cutline 1B prior to receiving thermoplastic powder from the powder applicator of the system in FIG. 1A.
Figure 1C:
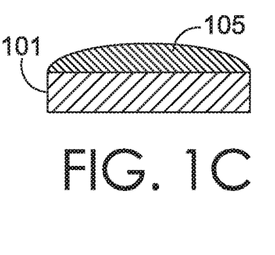
FIG. 1C is a cross-sectional view of a footwear component along the cutline 1C after receiving thermoplastic powder from the powder applicator of the system in FIG. 1A.

In aspects, once the footwear component 101 is transferred to a position underneath the powder applicator 104, the powder applicator 104 can apply a thermoplastic powder 105 to the footwear component 101. FIGS. 1B and 1C depict cross-sectional views of the footwear component along the respective cutlines 1B and 1C before application of the thermoplastic powder (FIG. 1B) and after application of the thermoplastic powder FIG. 1C.

The powder applicator 104 can be any commercially available powder applicator that is capable of applying a thermoplastic powder to the footwear component 101. In certain aspects, the thermoplastic powder 105 can be any commercially available thermoplastic material in powder form that can be used for reinforcing footwear components. A non-limiting list of thermoplastic powders includes a polyurethane material, a polyester material, a polyamide material, a polyolefin material, an ethylene vinyl acetate material, or a combination thereof.

Figure 1D:
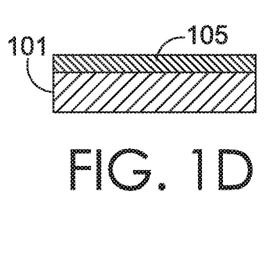
FIG. 1D is a cross-sectional view of a footwear component along the cutline 1D after being exposed to the leveler and while being exposed to the thermal energy source both from the system of FIG. 1A.

In one or more aspects, once the thermoplastic powder 105 has been applied to the footwear component 101, the conveyance system 102 can transfer the footwear component 101 to a leveler 106. In aspects, the leveler 106 can level the thermoplastic powder 105 that has been applied to the article of footwear 101. In such aspects, the leveler 106 can ensure that a substantially even amount or thickness of the thermoplastic powder 105 is present on the footwear component 101. FIG. 1D is a cross-sectional view of the footwear component 101 along the cutline 1D after being exposed to the leveler 106, showing the substantially even amount of thermoplastic powder on the footwear component.

In one or more aspects, the leveler 106 can include a substantially flat bar for scraping off thermoplastic powder 105 on the footwear component 101 as the footwear component 101 is conveyed along the conveyance system 102. In certain aspects, the leveler 106 can be vertically adjustable to control the thickness of the thermoplastic powder 105 on the footwear component 101. It should be understood that other powder leveling mechanisms can be utilized in this system 100, and that the leveler 106 is just one example depicted for leveling the applied thermoplastic powder 105.

In various aspects, the footwear component 101 with the levelled thermoplastic powder 105 can be transferred to a thermal energy source, such as the thermal energy source 108. In aspects, the thermal energy source 108 can include any thermal energy source that is capable of at least partially bonding the thermoplastic powder 105 with the footwear component 101. In one aspect, the thermal energy source 108 can include a laser energy source. In certain aspects, the laser energy source can include a 300 Watt $CO_2$ laser with a computer controlled Galvanometer positioning head.

In one or more aspects, the thermal energy source 108 can cause at least a portion of the thermoplastic powder 105 to melt or deform such that the melted or deformed thermoplastic powder 105 at least partially bonds to the footwear component 101 and/or to adjacent thermoplastic powder particles. In certain aspects, the thermoplastic powder 105 may have melted or deformed such that it can at least partially penetrate into or form about the footwear component material so as to become at least partially physically bonded thereto.

In one or more aspects, the thermal energy source 108, e.g., a laser energy source, is capable of directing laser energy to all or a portion of the footwear component 101 to at least partially bond the thermoplastic powder 105 thereto. For example, in one aspect, the laser energy source can move in a path so as to cover all or a portion of the facing surface of the footwear component 101. In certain aspects, the thermal energy source 108 can selectively apply thermal energy in the location and shape desired for the forming and bonding of a specific reinforcing component. It should be understood that one skilled in the art can adjust the type and strength of the thermal energy source 108 to apply to the thermoplastic powder 105 and the footwear component 101 based on the type and thickness of the thermoplastic powder 105 present thereon.

Figure 1E:
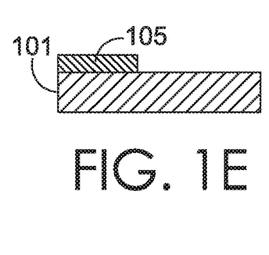
FIG. 1E is a cross-sectional view of a footwear component along the cutline 1E after being exposed to the un-bonded powder removal station from the system of FIG. 1A.

In certain aspects, the footwear component 101 after having been exposed to the thermal energy source 108 can be transferred to the un-bonded powder removal station 110. In such aspects, the un-bonded powder removal station 110 can include an air nozzle to supply a stream of air sufficient to remove the un-bonded thermoplastic powder without substantially altering the thermoplastic powder partly bonded to the footwear component 101. FIG. 1E depicts a cross-section along the cutline 1E of the footwear component 101 showing the at least partially bonded thermoplastic powder 105 present on the footwear component 101 while the un-bonded portion has been removed (compare to FIG. 1D).

In certain aspects, the stream of air can be heated so that the at least partially bonded thermoplastic powder 105 can be conditioned for further bonding and compression provided by the press 112. In certain aspects, the stream of air can provide an elevated temperature of at least about 21 degrees Celsius (° C.), at least about 23° C., or at least about 25° C. to the thermoplastic powder 105. In one aspect, the elevated temperature can be above the glass transition temperature of the thermoplastic powder 105 and/or below the melting temperature of the thermoplastic powder 105.

Figure 1F:
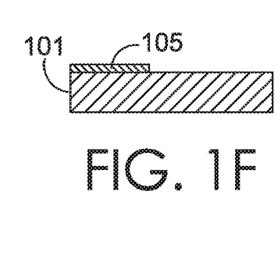
FIG. 1F is a cross-sectional view of a footwear component along the cutline 1F after being exposed to the roller from the system of FIG. 1A.

In various aspects, the footwear component 101 can be transferred to the press 112. In certain aspects, the press 112 can provide a substantially even force to the footwear component 101 so that the partially-bonded thermoplastic powder 105 becomes more permanently attached of fixed to the footwear component 101. As can be seen in FIG. 1A, in certain aspects, the press 112 can shift vertically, e.g., in order to apply a force or release from engagement with the footwear component 101. In aspects, the press 112 can include a planar press that applies a compressive force to the footwear component 101 and the thermoplastic powder 105 in order to more permanently bond the thermoplastic powder 105 to the footwear component 101. In an alternative aspect, the footwear component 101 and the thermoplastic powder 105 can be exposed to a compressive force via a roller press. FIG. 1F depicts a cross-sectional view of the footwear component 101 along the cutline 1F. As can be seen in FIG. 1F, the thermoplastic powder 105 has been compressed (compare to FIG. 1E), which more permanently fixes the thermoplastic powder 105 to the footwear component 101 and also compacts the thermoplastic powder 105 (increases the density) to provide an increased reinforcement functionality compared to the un-compacted thermoplastic powder 105.

In certain aspects, once the thermoplastic powder 105 has been more permanently bonded or fixed to the footwear component 101, the reinforced footwear component can be transferred or conveyed for further processing, as discussed further below.

Figure 2:
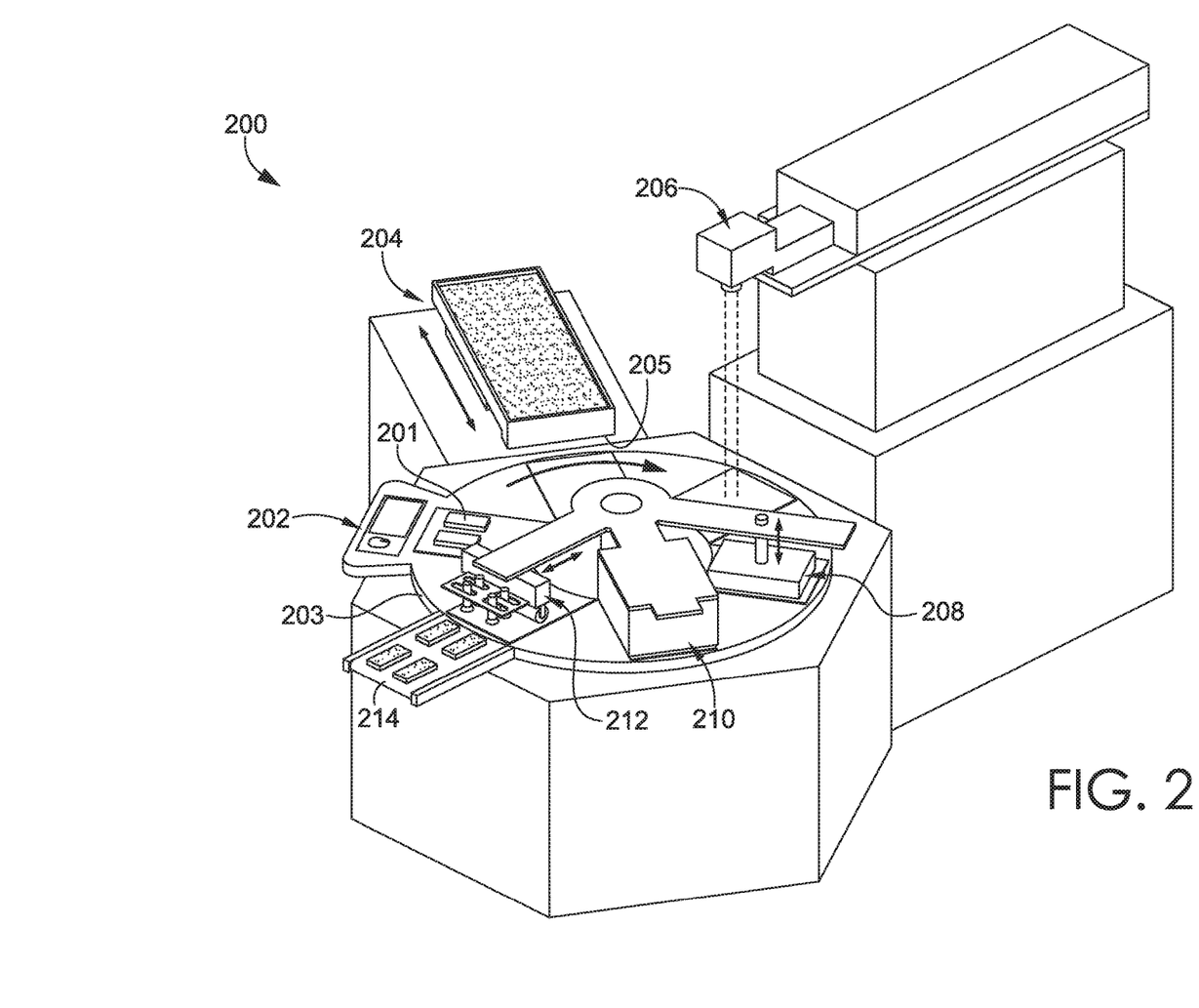
FIG. 2 is top and side perspective view of another exemplary system for reinforcing a footwear component that includes a vision system, a powder applicator, a thermal energy source, an un-bonded powder removal station, a heating chamber, and a press, in accordance with aspects hereof.

FIG. 2 depicts an alternative system 200 for reinforcing an article of wear, such as an article of footwear. In such aspects, the system 200 can be utilized to reinforce a footwear component 201, such as an upper for the article of footwear. In the aspect depicted in FIG. 2, the system 200 can include a vision system 202, a powder applicator 204, a thermal energy source 206, an un-bonded powder removal station 208, a heating chamber 210, and a press 212.

In certain aspects, the vision system 202 can be adapted to identify one or more of the type of footwear component 201, the size of the footwear component 201, and the orientation of the footwear component 201. In certain aspects, the vision system 202 can be any type of vision system or scanner capable of identifying the type, size, and orientation of the footwear component 201. In aspects, the vision system 202 can sense articles in two or three dimensions. A non-limiting list of specific vision system components includes a closed circuit television camera (CCTV) system, a visible light based sensing system, and an infrared based sensing system.

In one or more aspects, the vision system 202 can include a computer for receiving the imaging information, e.g., footwear orientation, size, and type, and for providing or determining a pattern for where the thermoplastic powder should be at least partially bonded to the footwear component 201. In such aspects, this pattern and/or orientation information can be communicated to one or more of the components of the system 200, such as the thermal energy source 206. In certain aspects, a user can specify a particular pattern or the computer can apply a predetermined pattern based on the identification of the size and type of footwear component identified.

In aspects, by utilizing a vision system 202 in communication with other components of the system 200, e.g., the thermal energy source 206, the system and processes disclosed herein can provide for a more streamlined process in that reduced labor and less equipment is needed since the system 200 would not require the footwear component 201 to be in any particular orientation. Further, labor and other equipment can be minimized since the vision system 202 can identify and communicate orientation and pattern information to the thermal energy source 206, thereby obviating or minimizing the need for system modifications, e.g., modifications for different types of footwear components (or different sizes of footwear components).

In certain aspects, the system 200 can include a conveyance system 203 configured to convey the footwear component 201 between the various components of the system 200. In aspects, the conveyance system 203 can include any conveyance system capable of transferring the footwear component 201 from one system component to the another system component. For example, as can be seen in FIG. 2, the conveyance system 203 can include a surface that shifts or rotates the footwear component 201 from the vision system 202 to the powder applicator 204, on to the thermal energy source 206, then to the un-bonded powder removal station 208, to the heating chamber 210, and then on to the press 212. In certain aspects, the conveyance system 203 and the position of the other system components 202, 204, 206, 208, 210, and 212 can allow for continuous operation so that a single movement of the conveyance system 203 to shift a footwear component from one system component to another, also shifts other footwear components between the other system components.

In certain aspects, after having been analyzed by the vision system 202, the footwear component 201 can be transferred to the powder applicator 204. In certain aspects, like the powder applicator 104 of FIG. 1A, the powder applicator 204 can apply a thermoplastic powder to the footwear component 201 indiscriminately; e.g., over the entire upward facing surface of the footwear component 201. The thermoplastic powder can have any or all of the properties discussed above.

In one or more aspects, as can be seen in FIG. 2, the powder applicator 204 can shift along a linear path while applying the thermoplastic powder to the footwear component 201. In such aspects, the powder applicator 204 can include a leveler 205 on one edge so that after the powder applicator extends over the footwear component 201 towards the heating chamber 210, the leveler 205 can level the applied thermoplastic powder on the footwear component 201 as the powder applicator retracts back over the footwear component 201 in a direction away from the heating chamber 210. In such aspects, having a leveler 205 integrated on the powder applicator 204 can provide increased efficiency and reduced manufacturing footprint, since the footwear component 201 can be maintained a single position to have thermoplastic powder applied and leveled.

In various aspects, after the thermoplastic powder has been applied and levelled on the footwear component 201, the footwear component 201 can shift positions to be exposed to the thermal energy source 206. In one aspect, the thermal energy source 206 can include any or all of the properties of the thermal energy source 108 discussed above with reference to FIG. 1A. For example, in one or more aspects, the thermal energy source 206 can include a laser energy source.

As discussed above, the vision system 202 can communicate information to the thermal energy source 206 associated with the orientation, size, and type of footwear component 201, and/or associated with a pattern for bonding or fusing of the thermoplastic powder on the footwear component 201. In aspects, the thermal energy source 206 can supply thermal energy to the thermoplastic powder and/or the footwear component 201 in the pattern desired for the particular footwear component 201. As discussed above, in aspects, the thermal energy applied can be sufficient to at least partially bond the thermoplastic powder to the footwear component 201 and/or partially bond of fuse together individual particles of the thermoplastic powder.

In aspects, after being exposed to the thermal energy source 206, the footwear component 201 can be transferred to the un-bonded powder removal station 208. In certain aspects, the un-bonded powder removal station 208 can include an air nozzle to expose the footwear component 201 to positive (e.g., compressed) or negative (e.g., vacuum) pressure to remove or recover the un-bonded thermoplastic powder. In one aspect, the un-bonded powder removal station 208 supplies positive or negative pressure in an amount sufficient for the removal of the un-bonded thermoplastic powder while not substantially altering the partial bonding between the partially bonded thermoplastic powder and the footwear component 201. As such, it is contemplated that the partial bonding is sufficient enough to maintain the thermoplastic powder at intended locations during the recovery process at the powder removal station 208. In certain aspects, as discussed above, the recovered un-bonded thermoplastic powder can be recycled for re-use in the systems disclosed herein or for other purposes. In one aspect, when the un-bonded powder removal station 208 provides positive pressure air for removal of the un-bonded thermoplastic powder, such air can be heated to the elevated temperatures discussed above.

In aspects, once the un-bonded thermoplastic powder has been removed from the footwear component 201, the footwear component 201 can be exposed to the heating chamber 210. In such aspects, the heating chamber 210 can expose the footwear component 201 and/or the partially bonded thermoplastic powder to an elevated temperature. For example, in certain aspects, the footwear component 201 and/or the partially bonded thermoplastic powder can be exposed to a temperature of at least about 21° C., at least about 23° C., or at least about 25° C. In aspects, the elevated temperature can be above the glass transition temperature of the thermoplastic powder and/or below the melting temperature of the thermoplastic powder. In aspects, the heating chamber 210 can include any heating source such, as an infrared heating source, a radiant heating source, or other conventional heating sources.

After being exposed to the elevated temperature, the footwear component 201 can be compressed to more fully bond the thermoplastic powder to the footwear component 201. For example, in such aspects, the footwear component can be exposed to a compressive force from the press 212. In the aspect depicted in FIG. 2, the press 212 can apply a compressive force via a roller. In alternative aspects, the press 212 can apply a compressive force via a planar press.

In various aspects, as discussed above, the compressive force applied by the press 212 can more permanently attach of fix the thermoplastic powder to the footwear component 201, which can also result in an increased density of the thermoplastic powder or material forming the reinforcing component on the footwear component 201.

In various aspects, once the footwear component 201 has been compressed, it can be transferred off the conveyance system 203 onto another conveyance system 214 for further processing.

As discussed above, the thermoplastic powder bonded and fixed to the footwear component can function as a reinforcement for the footwear component. For example, the reinforced component can: function as a rip stop material; function as a structural reinforcement, limit the stretch of a material the thermoplastic powder is bonded to, or function as a dimensional offset for a surface of the footwear component. It should be understood that other functions of thermoplastic powder reinforced footwear components are contemplated by the present invention and that the aforementioned list is non-limiting.

In certain aspects, the thermoplastic powder can be bonded to a backside, i.e., an interior-facing side, of the footwear component. As used herein, "backside" and "interior-facing side" both refer to the side of the footwear component that would face a wearer's foot when in use, whereas an "exterior-facing side" is located opposite of the interior-facing side.

Figure 3:
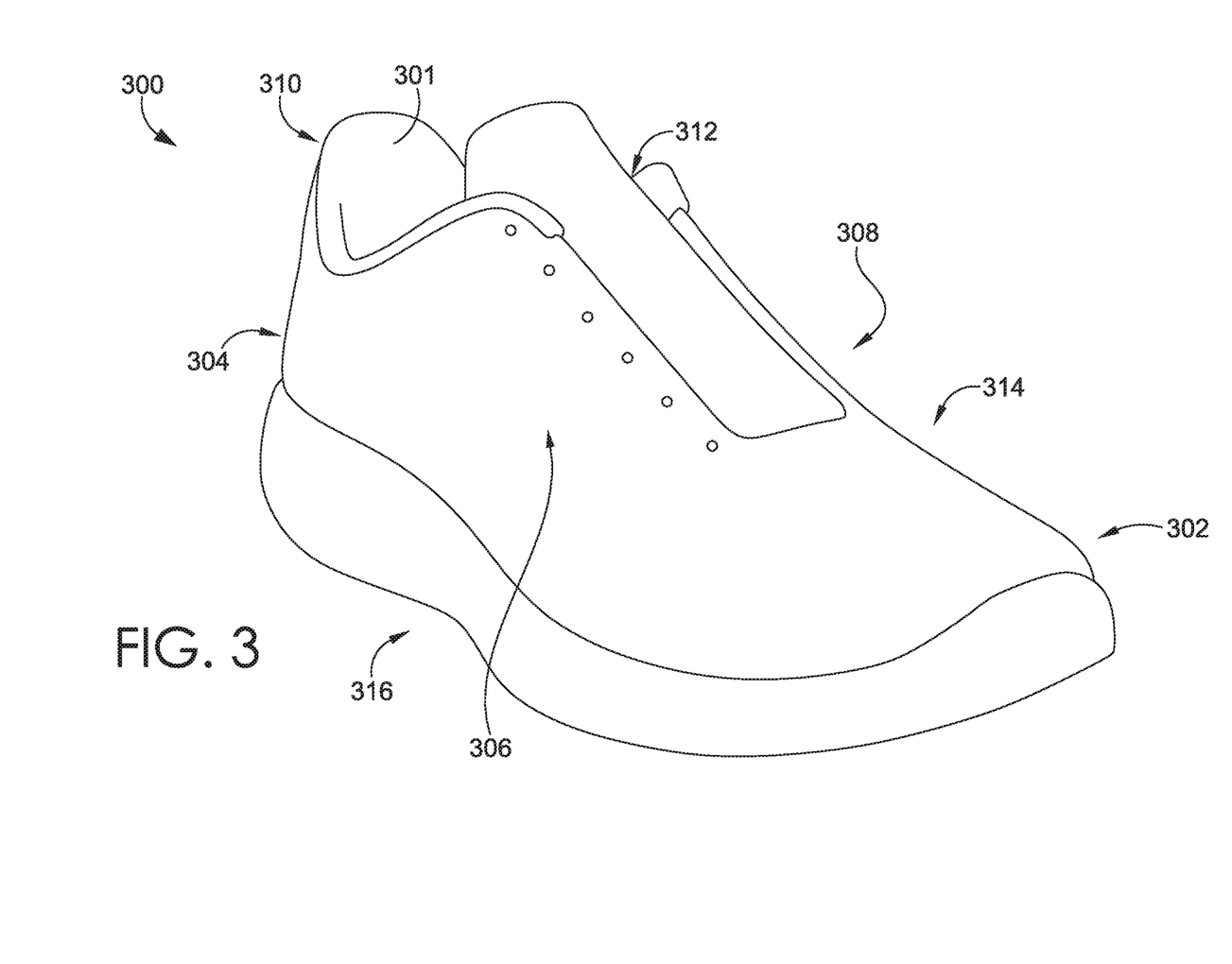
FIG. 3 is a top and side perspective view of an exemplary article of footwear, in accordance with aspects hereof.

In aspects, the thermoplastic powder can be bonded and fixed to the footwear component in any particular location depending upon the desired reinforcement needs. In one aspect, the footwear component can be an upper for an article of footwear, such as the article of footwear 300 depicted in FIG. 3. In certain aspects, the upper 314 can be reinforced, utilizing the systems and processes described herein, in an ankle collar portion 310, a forefoot opening portion 312, a heel counter portion 304, a toe box portion 302, a medial midfoot portion 308, a lateral midfoot portion 306, or a combination thereof. For example, a thermal energy source, e.g., a laser energy source, can apply thermal energy to any combination of the aforementioned portions of the upper 314 in order to bond and fix a thermoplastic powder thereto. In various aspects, as discussed above, a thermoplastic powder can be used to reinforce one or more of these portions of the upper 314 on the interior-facing side 301. While FIG. 3 depicts a completed article of footwear 300, in certain aspects, the upper 314 may be reinforced while in a flattened state prior to being incorporated into the completed article of footwear.

As discussed above, the thermoplastic powder fixed to the footwear component can provide a reinforcement functionality, such as structural integrity to the upper component as additional processing is occurring to form the completed article of footwear. For example, in certain aspects, as discussed above, prior to being formed into the completed article of footwear, the upper may be exposed to a cut in the reinforced area, where the bonded thermoplastic powder can provide a rip stop functionality to allow a clean cut without further tearing or fraying of the upper material.

In aspects, the reinforcement systems and methods described herein can transfer the footwear component, e.g., an upper, to a cutting tool subsequent to compressing the thermoplastic powder into the upper to form the reinforced upper. In such aspects, the cutting tool can be any common cutting tool used in forming articles of footwear as long as such a cutting tool is effective to form a cut that extends through the footwear component and the thermoplastic powder. A non-limiting list of such cutting tools includes a punch, for forming an aperture such as an eyelet, a die cut, a laser, a water jet, a media jet (e.g., sand or metal media), or a combination thereof.

Once the upper is cut, if necessary, or subjected to additional processing, the upper can be formed into the complete article of footwear. For example, as depicted in FIG. 3, a sole 316 can be combined with the upper 314 to form the completed article of footwear 300. It should be understood that, as discussed above, the reinforcement provided by the bonded thermoplastic powder can provide other reinforcing functionalities in addition to cut or fray protection, such as wear resistance, structural support, and stretch resistance.

Figure 4:
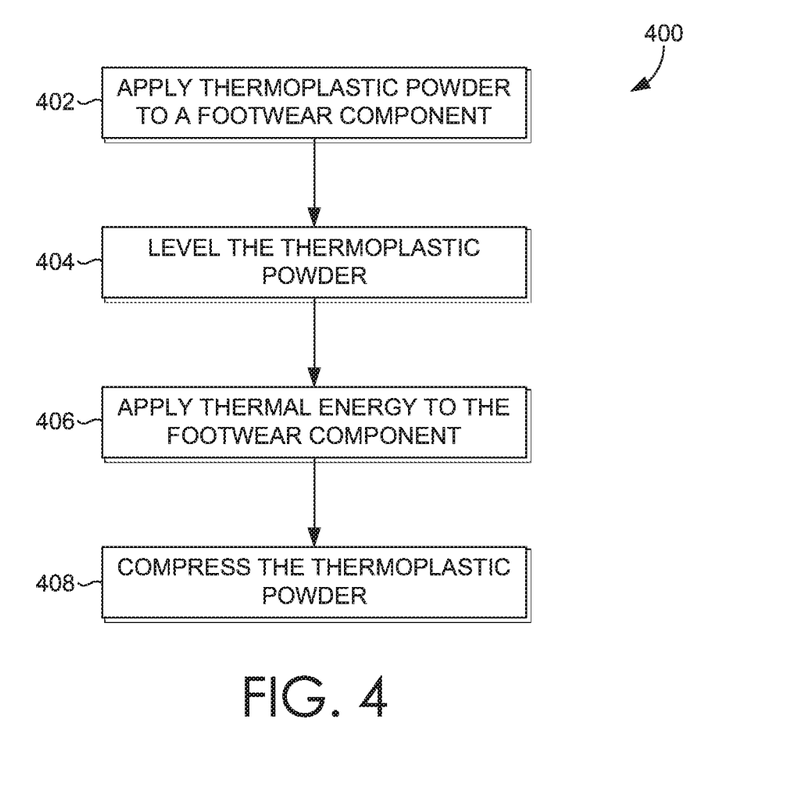
FIG. 4 is a flow diagram of a method for reinforcing a footwear component, in accordance with aspects hereof.

FIG. 4 depicts an exemplary method 400 of reinforcing a footwear component. The method 400 can include the step 402 of applying a thermoplastic powder to a footwear component. The thermoplastic powder can be applied the footwear component as described above with respect to the systems 100 and 200 of FIGS. 1A and 2, respectively. For example, the thermoplastic powder can be applied using the powder applicator 104 or 204 of FIGS. 1A and 2, respectively. The thermoplastic powder can include any or all of the properties discussed above.

At step 404, the method 400 includes levelling the thermoplastic powder. In aspects, the thermoplastic powder can be levelled as discussed above, such as by the use of the leveler 106 or 205 described above with reference to FIGS. 1A and 2, respectively.

The method 400 also includes a step 406 of applying thermal energy to the footwear component. In various aspects, the thermal energy source 108 or 206 described above with reference to FIGS. 1A and 2, respectively. For example, in certain aspects, the thermal energy source can include a laser energy source. In aspects, as discussed above, the thermal energy source can selectively apply thermal energy to the thermoplastic powder in a specific position and shape for the desired reinforcement profile. In various aspects, as discussed above, the application of thermal energy to the thermoplastic powder can at least partly bond the thermoplastic powder to the footwear component.

At step 408, the partially bonded thermoplastic powder can be compressed. In certain aspects, this compression can cause the partly bonded thermoplastic powder to become more fully bonded or fixed to the footwear component. In aspects, the thermoplastic powder can be compressed using the press 112 or 212 described above with reference to FIGS. 1A and 2, respectively.

In various aspects, as described above, prior to compressing the thermoplastic powder and subsequent to apply the thermal energy to the thermoplastic powder as in step 406, the un-bonded thermoplastic powder may be removed, such as by exposing the footwear component to the un-bonded powder removal station 110 or 208 described above with reference to FIGS. 1A and 2, respectively. For example, the footwear component may be exposed to a positive or negative pressure environment sufficient to remove the un-bonded thermoplastic powder from the footwear article. In various aspects, this recovered un-bonded thermoplastic powder can be re-used.

Further, as discussed above, in certain aspects, subsequent to applying thermal energy to the thermoplastic powder (or subsequent to removing the un-bonded thermoplastic powder) the footwear component may be exposed to another thermal energy source for heating or re-heating the thermoplastic powder prior to compression in step 406. In such aspects, the footwear component can be exposed to thermal energy as discussed above with reference to the heating chamber 210 of FIG. 2. In the same or alternative aspects, a heated air stream may be utilized for removing the un-bonded thermoplastic powder, which can also function to heating or re-heating the partially bonded thermoplastic powder prior to the compression of the step 408.

The invention claimed is:

1. A system for reinforcing a footwear component, the system comprising:
   a vision system capable of identifying the footwear component, determines its orientation, and provides a pattern of application for a thermoplastic powder on the footwear component, wherein the vision system is configured to determine one or more of a type, a size, a shape, or a position of the footwear component;
   a powder applicator capable of applying the thermoplastic powder to the footwear component based on the pattern of application;
   a leveler capable of leveling at least a portion of the thermoplastic powder, wherein the leveler includes a flat bar and is positioned a defined height above the footwear component; and
   a thermal energy source capable of applying thermal energy to the footwear component to at least partially bond the thermoplastic powder with the footwear component.

2. The system of claim 1, wherein the vision system comprises a camera.

3. The system of claim 1, wherein the thermal energy source is capable of selectively applying the thermal energy based on one or more vision system determinations for the footwear component.

4. The system of claim 3, wherein the thermal energy source originates from a laser energy source.

5. The system of claim 1, wherein the vision system is capable of determining the position of the footwear component.

6. The system of claim 1, wherein the thermal energy source is capable of selectively applying the thermal energy based on the vision system determination of the orientation of the footwear component.

7. The system of claim 6, wherein the thermal energy source originates from a laser energy source.

8. The system of claim 1 further comprising a press capable of compressing the thermoplastic powder and the footwear component, wherein the press is one of a planar press or a roller press.

9. The system of claim 8 further comprising an air nozzle, the air nozzle positioned between the thermal energy source and the press.

10. The system of claim 1 further comprising a cutting tool, the cutting tool effective to form a cut that extends through the footwear component and the thermoplastic powder.

11. The system of claim 1, wherein the powder applicator applies the thermoplastic powder to a backside of the footwear component.

12. The system of claim 1, wherein the thermal energy is applied to the footwear component at at least one selected from the following:
(1) an ankle collar portion;
(2) a forefoot opening portion;
(3) a heel counter portion;
(4) a toe box portion;
(5) a medial midfoot portion; or
(6) a lateral midfoot portion.

13. A system of reinforcing a footwear component, the system comprising:
a powder applicator capable of applying a thermoplastic powder to the footwear component;
a leveler capable of leveling at least a portion of the thermoplastic powder, wherein the leveler is positioned a defined height above the footwear component;
a thermal energy source capable of applying thermal energy to the footwear component to at least partially bond the thermoplastic powder with the footwear component;
a press capable of compressing the thermoplastic powder and the footwear component allowing for a bonding of the thermoplastic powder to the footwear component.

14. The system of claim 13, further comprising a vision system comprising a camera, the vision system determines one or more of a type, a size, a shape, an orientation, or a position of the footwear component.

15. The system of claim 14, wherein the thermal energy source is capable of selectively applying the thermal energy based on the one or more vision system determinations of the footwear component.

16. The system of claim 15, wherein the thermal energy source originates from a laser energy source.

17. The system of claim 13, further comprising an air nozzle, the air nozzle positioned between the thermal energy source and the press.

18. The system of claim 13, wherein the press is one of a planar press or a roller press.

19. The system of claim 13, further comprising a cutting tool, the cutting tool positioned after the press and effective to form a cut that extends through the footwear component and the thermoplastic powder.

20. The system of claim 13, wherein the thermal energy is applied to the footwear component at at least one selected from the following:
(1) an ankle collar portion;
(2) a forefoot opening portion;
(3) a heel counter portion;
(4) a toe box portion;
(5) a medial midfoot portion; or
(6) a lateral midfoot portion.

* * * * *

UNITED STATES PATENT AND TRADEMARK OFFICE
CERTIFICATE OF CORRECTION

| | |
|---|---|
| PATENT NO. | : 12,122,093 B2 |
| APPLICATION NO. | : 17/341091 |
| DATED | : October 22, 2024 |
| INVENTOR(S) | : Steven Edmund Jan Cornelis Ploem and Thi Tran |

Page 1 of 1

It is certified that error appears in the above-identified patent and that said Letters Patent is hereby corrected as shown below:

On the Title Page

In Item (72) Inventors, Under Column no. 1, Line nos. 2-3 please replace "Ho Chi Minh (VN)" with "Ho Chi Minh City (VN)"

Signed and Sealed this
First Day of July, 2025

Coke Morgan Stewart
*Acting Director of the United States Patent and Trademark Office*